United States Patent
Cocchi et al.

(10) Patent No.: US 10,653,164 B2
(45) Date of Patent: *May 19, 2020

(54) ICE CREAM DISPENSING DEVICE AND METHOD AND MACHINE FOR MAKING ICE CREAM

(71) Applicant: ALI GROUP S.r.l.—CARPIGIANI, Cernusco Sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco Sul Naviglio (IT)

(*) Notice: Subject to any disclaimer, the term of this patent is extended or adjusted under 35 U.S.C. 154(b) by 0 days.

This patent is subject to a terminal disclaimer.

(21) Appl. No.: 15/168,764

(22) Filed: May 31, 2016

(65) Prior Publication Data
US 2016/0353767 A1  Dec. 8, 2016

(30) Foreign Application Priority Data
Jun. 4, 2015 (IT) .............................. 102015020565

(51) Int. Cl.
*A23G 9/28* (2006.01)
*A23G 9/48* (2006.01)
(Continued)

(52) U.S. Cl.
CPC ............... *A23G 9/282* (2013.01); *A23G 9/08* (2013.01); *A23G 9/166* (2013.01); *A23G 9/224* (2013.01);
(Continued)

(58) Field of Classification Search
CPC ........ B65D 2081/001; B65D 2081/007; B65D 83/06; B65D 85/60; B65D 85/78;
(Continued)

(56) References Cited

U.S. PATENT DOCUMENTS 1,774,408 A    9/1930   Gladish
5,464,119 A   11/1995   Giuseppe et al.
(Continued)

FOREIGN PATENT DOCUMENTS

EP   1068803 A1   1/2001
EP   1787524 A2   5/2007
(Continued)

OTHER PUBLICATIONS

Italian Search Report dated Nov. 15, 2016 from related Italian App No. US20162571.
(Continued)

*Primary Examiner* — Drew E Becker
(74) *Attorney, Agent, or Firm* — Shuttleworth & Ingersoll, PLC; Timothy Klima

(57) ABSTRACT

A method for making variegated ice cream, comprising the following steps:
preparing container for processing the basic ice cream product;
cooling and stirring a basic preparation inside the processing container to make the basic ice cream product;
preparing a hermetically sealed capsule containing an additional flavor;
opening the capsule;
simultaneously transferring a portion of basic ice cream product from the processing container to a serving container and transferring the additional flavor from the open capsule to the basic ice cream product to produce a variegated ice cream product, which is defined by combining the basic product and the additional flavor.

11 Claims, 3 Drawing Sheets

(51) Int. Cl.
*A23G 9/08* (2006.01)
*A23G 9/16* (2006.01)
*B65D 85/78* (2006.01)
*B65D 85/60* (2006.01)
*B65D 85/804* (2006.01)
*A23G 9/22* (2006.01)
*B65D 81/00* (2006.01)

(52) U.S. Cl.
CPC .............. *A23G 9/283* (2013.01); *A23G 9/48* (2013.01); *B65D 85/60* (2013.01); *B65D 85/78* (2013.01); *B65D 85/8043* (2013.01); *B65D 2081/007* (2013.01)

(58) Field of Classification Search
CPC ... B65D 85/8043–85/8046; A23G 9/08; A23G 9/28–9/288; A23G 9/282; A23G 9/48; A23G 9/52; A23G 2220/20; A23G 9/166; A23G 9/283
See application file for complete search history.

(56) References Cited

U.S. PATENT DOCUMENTS

| | | | |
|---|---|---|---|
| 5,505,336 | A | 4/1996 | Montgomery et al. |
| 5,957,040 | A | 9/1999 | Feola |
| 6,068,875 | A | 5/2000 | Miller et al. |
| 6,453,803 | B1 | 9/2002 | Sodeyama et al. |
| 7,604,826 | B2 | 10/2009 | Denisart et al. |
| 2006/0255066 | A1 | 11/2006 | Kannar et al. |
| 2011/0110180 | A1 | 5/2011 | Snider et al. |
| 2012/0074176 | A1 | 3/2012 | Sullivan et al. |
| 2012/0097705 | A1 | 4/2012 | Py |
| 2012/0217264 | A1 | 8/2012 | Cocchi et al. |
| 2015/0344219 | A1 | 12/2015 | Bartoli et al. |
| 2016/0052706 | A1 | 2/2016 | Talon et al. |
| 2016/0353767 | A1 | 12/2016 | Cocchi et al. |
| 2017/0215456 | A1 | 8/2017 | Noth et al. |

FOREIGN PATENT DOCUMENTS

| | | |
|---|---|---|
| EP | 2189067 A1 | 5/2010 |
| EP | 2409931 A1 | 1/2012 |
| EP | 2505070 A1 | 10/2012 |
| GB | 1165448 A | 10/1969 |
| GB | 1423123 A | 1/1976 |
| JP | 1886190 U | 10/1973 |
| JP | 2001204393 A | 7/2001 |
| JP | 2001204394 A | 7/2001 |
| JP | 2001211831 A | 8/2001 |
| JP | 2001211832 A | 8/2001 |
| JP | 200093309 A | 10/2001 |
| JP | 200125365 A | 8/2002 |
| WO | WO9413154 A2 | 6/1994 |
| WO | 99497391 A1 | 10/1999 |
| WO | WO2014053614 A1 | 4/2014 |
| WO | 2014102701 A1 | 7/2014 |
| WO | WO2015022678 A1 | 2/2015 |
| WO | WO2015024798 A1 | 2/2015 |

OTHER PUBLICATIONS

Unknown: "Come preparare il gelato variegato alla Nutella", Mar. 15, 2015, XP002750679, Retrieved from the Internet: URL:https://web.archive.org/web/20150316022547/http://guidecucina.pianetadonna.it.come-preparare-il-gelato-variegato-alla-nutella-231122.htm, Retrieved on Nov. 9, 2015.

Italian Search Report dated Nov. 9, 2015 from counterpart Italian App No. UB20151198.

European Office Action dated Dec. 21, 2018 for related European Patent Application No. 17164207.7.

Office Action issued by the European Patent Office for counterpart European Application No. EP 16 172 275.6.

Japanese Office Action dated Dec. 24, 2019 for counterpart Japanese Patent Application No. JP2016111510.

Cocchi—U.S. Appl. No. 15/481,071 filed Apr. 6, 2017.

ICE CREAM DISPENSING DEVICE AND METHOD AND MACHINE FOR MAKING ICE CREAM

This application claims priority to Italian Patent Application 102015000020565 filed Jun. 4, 2015, the entirety of which is incorporated by reference herein.

BACKGROUND OF THE INVENTION

This invention relates to a device for dispensing variegated ice cream (of the soft type) and to a method and a machine for making such variegated ice cream.

As is known, variegated ice cream (of the soft type) is usually made up of a basic flavor (basic ice cream of the soft type) with one or more further flavors, obtained from syrups (differing in flavor and color), applied on the surface thereof.

As is known, a need which is strongly felt by operators in the trade is that of having a device for dispensing variegated ice cream which allows obtaining a particularly high degree of food safety, that is to say, which allows reducing potential risks of contaminating the variegated ice cream product being processed.

SUMMARY OF THE INVENTION

The aim of this invention is to meet the above mentioned need by providing a variegated ice cream dispensing device and a method and a machine for making ice cream to meet the above mentioned need.

More specifically, this invention has for an aim to provide an ice cream dispensing device and a machine and method which allow variegated ice cream to be made and dispensed particularly easily, avoiding all risks of accidentally contaminating the product being processed.

The invention also has for an aim to provide an ice cream dispensing device and a method and machine which allow variegated ice cream to be made and served particularly quickly and easily, in different flavor combinations (starting from the same basic flavor).

BRIEF DESCRIPTION OF THE DRAWINGS

The technical features of the invention, with reference to the above aims, are clearly described in the claims below and its advantages are apparent from the detailed description which follows, with reference to the accompanying drawings which illustrate a preferred, non-limiting example embodiment of the invention, and in which:

DESCRIPTION OF THE PREFERRED EMBODIMENTS

Figure 1:
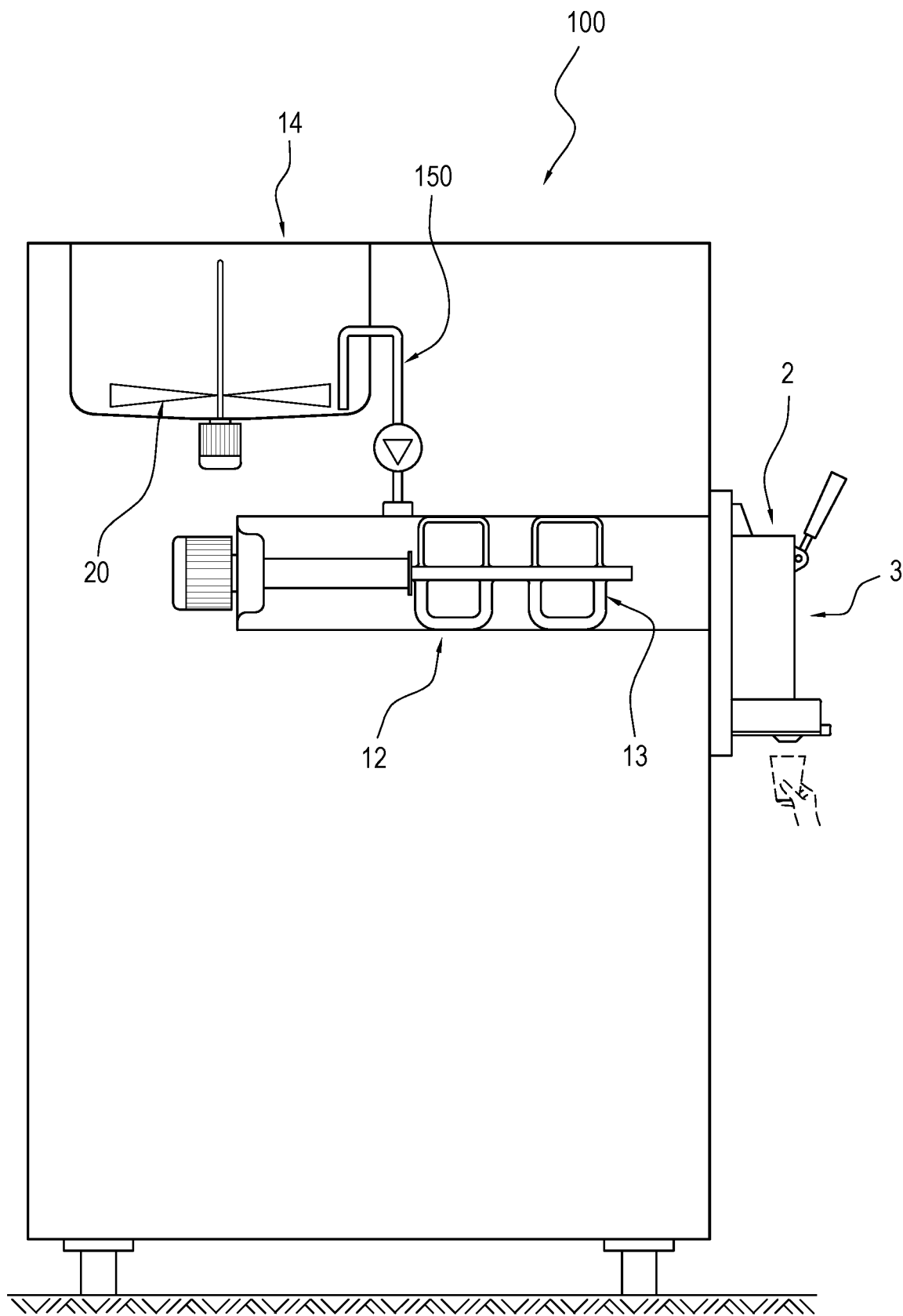
FIG. 1 is a schematic side view of a first embodiment of a machine according to this invention.
Figure 3:
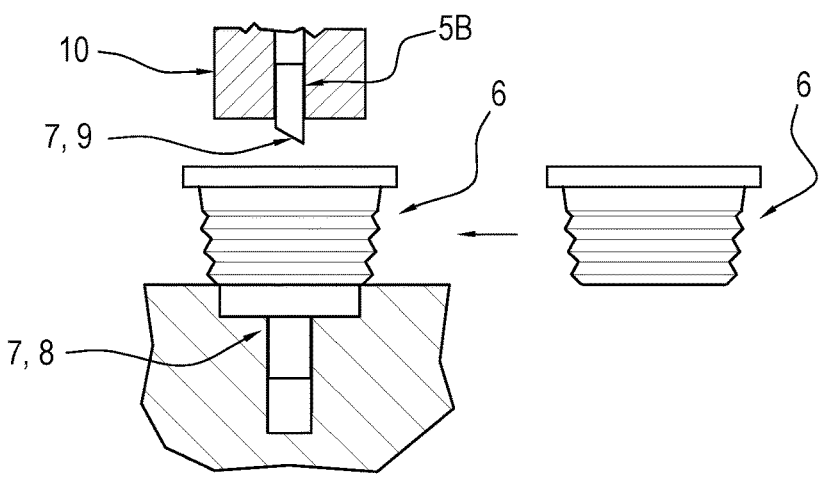
FIG. 3 shows a schematic, scaled-up view of a detail K of the machine of FIG. 2.

With reference to the accompanying drawings, the numeral 100 denotes a (soft) ice cream machine designed to make variegated ice cream (of the soft type).

The reference numeral 2, on the other hand, denotes a device for dispensing variegated ice cream in a machine 100 for making variegated ice cream.

The device 2 is equipped with a dispensing head 3 (defined by a base unit), which comprises:

a channel 5A for the infeed of a basic ice cream product;

a seat 5 for receiving a capsule 6 containing an additional flavor;

at least one element 7 for making contact with the capsule 6 when it is inserted in the receiving seat 5, configured to make contact with the capsule 6 and to cause the capsule 6 to open;

a transfer channel 5B configured to transfer the additional flavor extracted from the capsule 6.

It should be noted that the capsule 6 is a hermetically sealed, disposable receptacle containing an additional flavor.

Preferably, the walls of the capsule are made of a laminated metallic material (for example, a thin aluminum sheet) or plastic.

Figure 2:
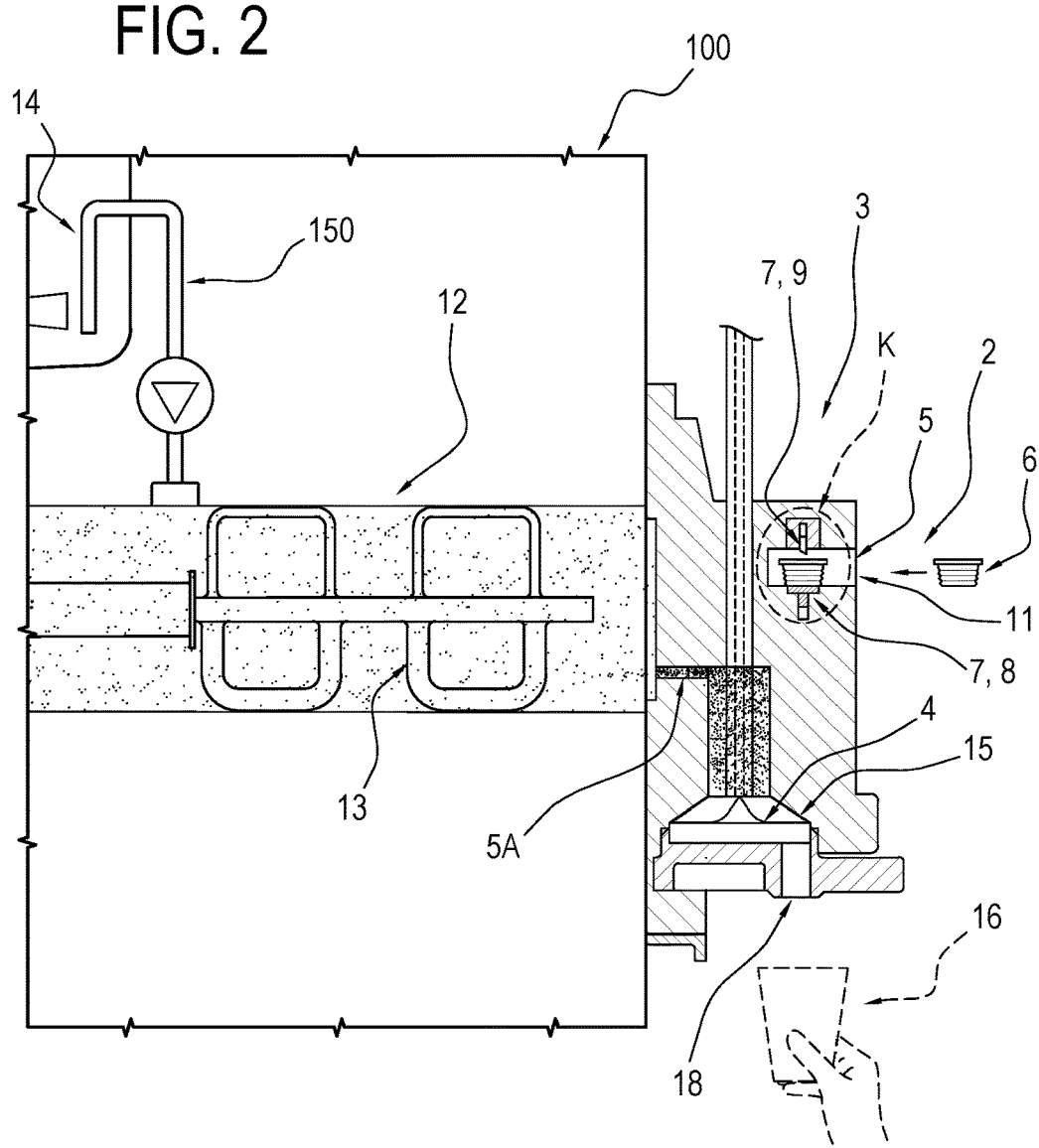
FIG. 2 shows a schematic view, partly in cross section, of a first embodiment of the machine of FIG. 1.

In the embodiment of FIG. 2, the dispensing device 2 also comprises:

a mixing chamber 4;

a mixer element 15 positioned inside the mixing chamber 4, configured to be driven in rotation to mix, inside the mixing chamber (4), the basic ice cream and the additional flavor to produce a variegated ice cream product, which is defined by the sum of the basic ice cream and the additional flavor;

an outlet mouth 18 connected to the mixing chamber 4 to transfer the variegated ice cream product outside the mixing chamber 4.

It should be noted that in this embodiment, the infeed channel 5A and the transfer channel 5B are connected to the mixing chamber 4. In particular, the infeed channel 5A and the transfer channel 5B lead into the mixing chamber 4.

Figure 4:
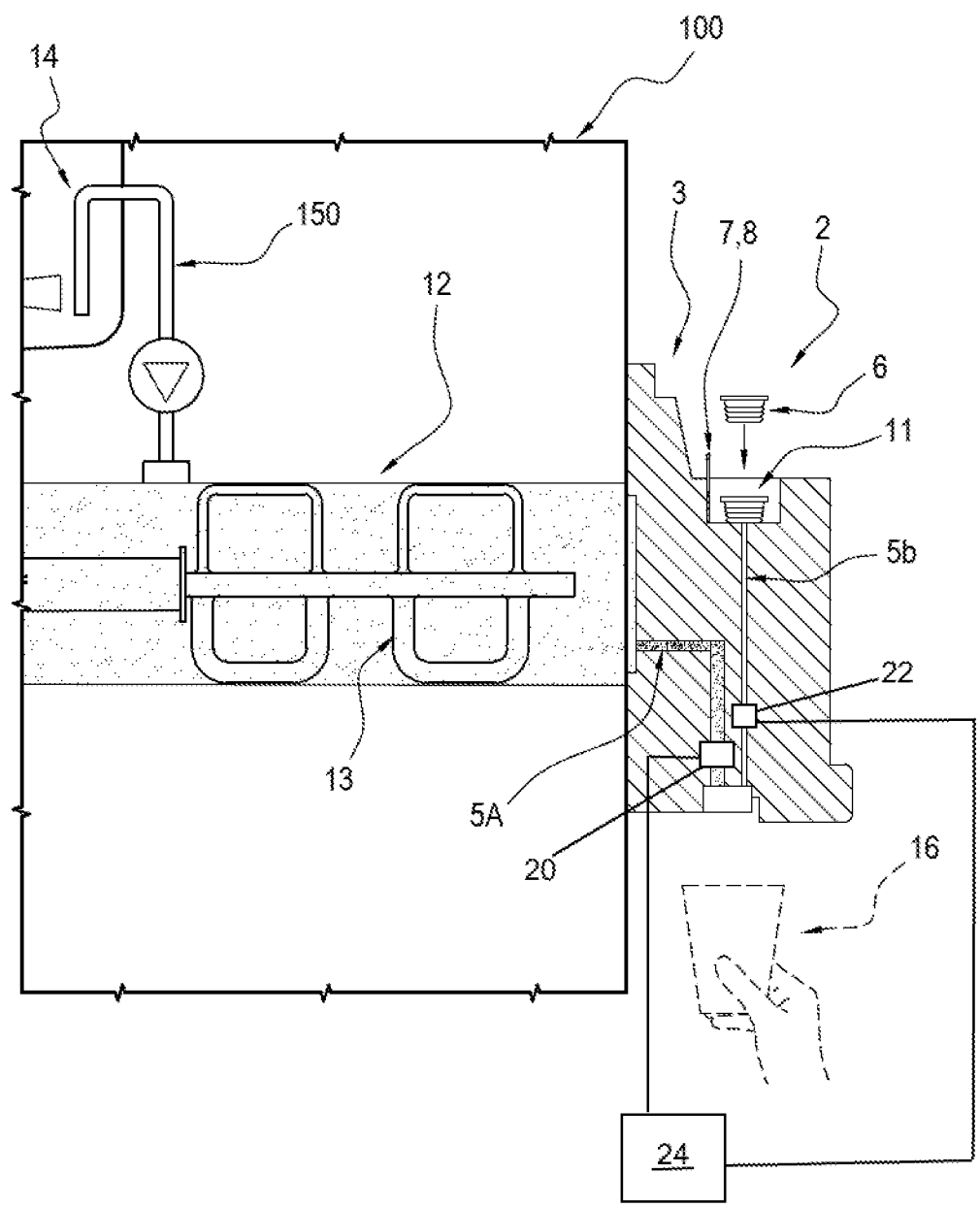
FIG. 4 shows a schematic view, partly in cross section, of a first embodiment of the machine of FIG. 1.

According to the embodiment illustrated in FIG. 4, on the other hand, the infeed channel 5A and the transfer channel 5B are directed downwards, defining two bottom openings.

In this embodiment, the infeed channel 5A delivers the basic ice cream directly into a serving container 16 below it.

The transfer channel 5B delivers the additional flavor directly onto the basic ice cream (onto the surface or body thereof) in the serving container 16.

It should be noted that according to this aspect, the machine 100 may comprise a supporting device (not illustrated) for holding the serving container 16 and having a seat for supporting the serving container 16.

It should be noted that the supporting seat is preferably rotatable and the machine 100 comprises an actuator configured to drive the supporting seat in rotation.

Thus, when the ice cream is being dispensed, the serving container 16 may be rotated so that the additional flavor can be distributed easily over different parts of the surface or body of the basic ice cream.

Alternatively, according to another aspect (not illustrated), the end portion of the transfer channel 5B may be movable, in particular configured to rotate about a vertical axis.

According to this aspect, when the ice cream is being dispensed, the additional flavor can be distributed easily over different parts of the surface or body of the basic ice cream.

The machine 100 for making (soft) ice cream, comprises:

a variegated ice cream dispensing device 2, as described above;

a container 12 for processing the basic ice cream product;

a cooling system, provided with a heat exchanger associated with the processing container 12, for exchanging heat with (and also cooling), the processing container 12;

a stirrer 13 positioned inside the processing container 12.

The infeed channel 5A is connected (at one end) to the processing container 12 to receive basic ice cream therefrom.

With reference to the dispensing device 2 (in both the first and the second embodiment, the element 7 for making contact with the capsule 6 comprises a compression element 8 which is movable between a non-operating position and a compression operating position in which it has made contact with and has deformed the capsule 6 inserted in the receiving seat 5.

According to this aspect, the capsule 6 is preferably deformable, that is to say, provided with one or more preferential lines of deformation.

According to another aspect, the contact element 7 comprises a piercing element 9 configured to pierce the capsule 6 inserted in the receiving seat 5.

Preferably, the piercing element 9 is provided with a tip which is configured to pierce the capsule 6.

The dispensing device comprises an actuator 10 for the relative movement of the piercing element 9 and the capsule 6, to allow moving the piercing element 9 and the capsule 6 relative to each other between a spaced-apart position and a close-together position of mutual contact.

The above mentioned actuator 10 preferably operates on the piercing element 9 to move it from a position of non-interference with the capsule 6 to a position where it is in contact with and pierces the capsule 6.

Alternatively, the actuator 10 operates on the capsule 6 to move it from a position of non-interference with the piercing element 9 to a position where it is in contact with the piercing element 9.

According to one aspect, the piercing element 9 is internally hollow. This allows the additional flavor (preferably a syrup to pass through it and to be transferred to the second transfer channel 5B.

It should be noted, according to another aspect, that the mixer element 15 is provided with one or more vanes.

The mixer element 15 is driven in rotation by an actuator (not illustrated), for example a motor.

According to another aspect, the dispensing device 2 also comprises a first shutter 20, designed to close the infeed channel 5A, and a second shutter 22, designed to close the transfer channel 5B. See, for example, FIG. 4.

The above mentioned first and second shutters 20, 22 are preferably independent of each other.

It should be noted that, according to another aspect, the machine 100 is preferably equipped with a drive and control unit 24.

It should be noted that the drive and control unit 24 is preferably connected to the first and second shutters 20, 22 in order to open and close them.

Preferably, the machine 100 comprises a user interface provided with control commands.

It should be noted that the control commands preferably allow driving the first and second shutters (to open/close).

According to another aspect, the dispensing head 3 is provided with an opening 11 designed to allow the capsule 6 to be inserted into the relative containing seat 5 (preferably from the front or from above.

In one embodiment, the capsule 6 comprises a powder, and, for this reason, according to this embodiment, the dispensing head (3) is provided with a diluting device (not illustrated) configured to deliver a diluting liquid (for example, water) into the capsule 6 when the capsule 6 is inserted in the seat 5 so as to obtain the additional flavor, as a combination of the powder and diluting liquid.

The machine 100 comprises, as illustrated in FIG. 1 (but this aspect also applies to the embodiment of FIG. 4), a further container 14 for containing a basic preparation for the basic ice cream and a transfer duct 150 connectable to the further containment container 14 and to the processing container 12 to transfer the basic preparation from the containment container 14 to the processing container 12.

Preferably, the further container 14 for containing a basic preparation comprises a stirrer 20 mounted inside the further container 14 and configured to rotate in such a way as to mix and stir the basic preparation.

In order to make the soft ice cream, the machine 100 may also comprise an air intake device for feeding air into the processing container 12.

The air intake device may comprise a rotary element which allows blowing air into the processing container 12 in order to allow implementing the process for making ice cream of the soft type.

Indeed, as is known, soft ice cream, compared to traditional ice cream, contains a higher percentage of air per unit volume.

Alternatively,—according to what is known as the "gravity method"—the air intake device may comprise a connecting duct between the containment container 14 and the processing container 12 in order to transfer the product from one container to the other.

The connecting duct is provided with a first opening at the bottom of the containment container 14 to receive product from the containment container 14 and a second opening placed over the bottom of the containment container 14 to allow air to be taken into the duct itself.

According to this aspect, rotating the stirrer inside the processing container 12 allows transferring air and basic product into the processing container 12.

Advantageously, the dispensing device 2 described above is applicable to a plurality of machines to allow retrofitting existing machines.

It should also be noted that the dispensing device 2 allows increasing food safety, since the capsule 6 is substantially of the disposable type: this avoids keeping the product making up the additional flavor inside the machine 100 for long periods of time.

In effect, the capsule 6 is placed in the machine 100 only when necessary, that is to say, when the variegated ice cream (consisting of the basic ice cream plus the additional flavor) is actually dispensed.

Further, according to another aspect, the device proposed advantageously allows the additional flavor to be distributed on the basic flavor in an optimum manner.

It should be noted that the device proposed is particularly simple and compact, unlike prior art solutions which had a complex system for transporting and distributing the syrups.

Advantageously, according to this aspect, the machine 100 (equipped with the dispensing device 2) is particularly compact.

Also defined according to the invention is a method for making variegated soft ice cream.

The method comprises the following steps:

preparing a container 12 for processing the basic ice cream product;

cooling (preferably to a temperature between −15° C. and 0° C.) and stirring a basic preparation (for ice cream) inside the processing container 12 to make the basic ice cream product;

preparing a hermetically sealed (disposable) capsule 6 containing an additional flavor;

opening the capsule 6;

simultaneously transferring a portion of basic ice cream product from the processing container 12 to a serving container 16 and transferring the additional flavor from the open capsule 6 to the basic ice cream product (on the surface or in the body of the basic ice cream) to produce a variegated ice cream, which is defined by combining the basic product and the additional flavor.

According to another aspect, the step of transferring the additional flavor from the open capsule 6 to the basic ice cream product comprises a step of squeezing the capsule 6 to cause the additional flavor to come out of the open capsule 6 and the additional flavor to be transferred onto the basic ice cream product.

According to yet another aspect the step of opening the capsule 6 comprises a step of preparing a piercing element 9 and a further step of using the piercing element 9 to pierce the walls of the capsule 6 in order to open it.

Preferably, the piercing element 9 is hollow inside and the step of simultaneously transferring a portion of basic ice cream product from the processing container 12 to a serving container 16 and transferring the additional flavor from the open capsule 6 to the basic ice cream product comprises a step of extracting the additional flavor from the capsule 6 using the piercing element 9.

According to yet another aspect, the additional flavor is transferred into the basic ice cream when the basic ice cream is inside the serving container 16.

According to another aspect, the step of simultaneously transferring a portion of basic ice cream product from the processing container 12 to a serving container 16 and transferring the additional flavor from the open capsule 6 to the basic ice cream product comprises a step of transferring the portion of basic ice cream product and the additional flavor into a mixing chamber 4, to mix the basic ice cream product and the additional flavor inside the mixing chamber 4, and a subsequent step of releasing the basic ice cream product and the additional flavor defining the variegated ice cream from the mixing chamber 4 into the serving container 16.

According to yet another aspect, the step of preparing a hermetically sealed capsule 6 containing an additional flavor comprises a step of preparing a hermetically sealed capsule 6 containing a syrup constituting the additional flavor.

What is claimed is:

1. A method for making variegated ice cream, comprising the following steps:
   providing a machine for making variegated ice cream, comprising:
      a body;
      a processing container for processing a basic ice cream product;
      a cooling system including a heat exchanger associated with the processing container, to exchange heat with, and cool, the processing container;
      the processing container and cooling system positioned in an interior of the body;
      a stirrer positioned inside the processing container;
      a dispensing head positioned on an exterior of the body, comprising:
         an infeed channel for infeed of the basic ice cream product;
         a receiving seat for receiving a capsule that is hermetically sealed and contains an additional flavor;
         at least one contact element configured to make contact with the capsule and to cause the capsule to open when the capsule is inserted in the receiving seat, wherein the at least one contact element is movable between a spaced apart position away from the capsule and a contact position with the capsule in which the at least one contact element opens the capsule, wherein the at least one contact element comprises a piercing element which is movable with respect to the capsule to pierce the capsule;
         wherein the at least one contact element comprises a compression element which is movable between a non-operating position and a compression operating position in which the compression element has made contact with and has deformed the capsule inserted in the receiving seat;
         an first actuator for relative movement of the piercing element and the capsule, to allow moving the piercing element and the capsule relative to each other between a spaced-apart position and a close-together position of mutual contact;
         a transfer channel configured to transfer the additional flavor extracted from the capsule;
         a supporting device including a supporting seat which is rotatable; and
         an second actuator for driving the supporting seat in rotation;
         a first shutter positioned to close the infeed channel;
         a second shutter positioned to close the transfer channel;
         wherein the first and second shutters are independent;
         a mixing chamber and a mixer element positioned inside the mixing chamber, configured to be driven in rotation to mix, inside the mixing chamber, the basic ice cream and the additional flavor to produce a variegated ice cream product, which is defined by a sum of the basic ice cream and the additional flavor;
         wherein the infeed channel and the transfer channel are directly connected to the mixing chamber to discharge into the mixing chamber;
         an outlet mouth connected to the mixing chamber to transfer the variegated ice cream product outside the mixing chamber;
      a drive and control unit which is connected to the first shutter and the second shutter to open and close the first shutter and the second shutter;
      a user interface connected with the drive and control unit for controlling opening and closing of the first shutter and the second shutter;
   preparing a processing container for processing the basic ice cream product, the processing container being connected to the infeed channel;
   cooling and stirring a basic preparation inside the processing container to obtain the basic ice cream product;
   providing the capsule containing the additional flavor;
   opening the capsule with the at least one contact element;
   simultaneously transferring a portion of the basic ice cream product from the processing container through the infeed channel to a serving container and transferring the additional flavor from the open capsule through the transfer channel to the basic ice cream product to produce the variegated ice cream product.

2. The method according to claim 1, wherein the step of simultaneously transferring comprises a step of squeezing the capsule to cause the additional flavor to exit the open capsule and be transferred onto the basic ice cream product.

3. The method according to claim 1, wherein the piercing element is hollow inside and the step of simultaneously transferring comprises a step of extracting the additional flavor from the capsule using the piercing element.

4. The method according to claim 1, wherein the step of providing the capsule comprises a step of providing that the capsule contains a syrup forming the additional flavor.

5. A machine for making variegated ice cream, comprising:
- a body;
- a processing container for processing a basic ice cream product;
- a cooling system including a heat exchanger associated with the processing container, to exchange heat with, and cool, the processing container;
- a stirrer positioned inside the processing container;
- the processing container and cooling system positioned in an interior of the body;
- a dispensing head positioned on an exterior of the body, comprising:
  - an infeed channel for infeed of the basic ice cream product;
  - a receiving seat for receiving a capsule containing an additional flavor;
  - at least one contact element configured to make contact with the capsule and to cause the capsule to open when the capsule is inserted in the receiving seat, wherein the at least one contact element is movable between a spaced apart position away from the capsule and a contact position with the capsule in which the at least one contact element opens the capsule, wherein the at least one contact element comprises a piercing element which is movable with respect to the capsule to pierce the capsule;
  - wherein the at least one contact element comprises a compression element which is movable between a non-operating position and a compression operating position in which the compression element has made contact with and has deformed the capsule inserted in the receiving seat;
  - a first actuator for relative movement of the piercing element and the capsule, to allow moving the piercing element and the capsule relative to each other between a spaced-apart position and a close-together position of mutual contact;
  - a transfer channel configured to transfer the additional flavor extracted from the capsule;
  - a supporting device including a supporting seat which is rotatable; and
  - an second actuator for driving the supporting seat in rotation;
  - a first shutter positioned to close the infeed channel;
  - a second shutter positioned to close the transfer channel;
  - wherein the first and second shutters are independent;
  - a mixing chamber and a mixer element positioned inside the mixing chamber, configured to be driven in rotation to mix, inside the mixing chamber, the basic ice cream and the additional flavor to produce a variegated ice cream product, which is defined by a sum of the basic ice cream and the additional flavor;
  - wherein the infeed channel and the transfer channel are directly connected to the mixing chamber to discharge into the mixing chamber;
  - an outlet mouth connected to the mixing chamber to transfer the variegated ice cream product outside the mixing chamber;
  - a drive and control unit which is connected to the first shutter and the second shutter to open and close the first shutter and the second shutter;
  - a user interface connected with the drive and control unit for controlling opening and closing of the first shutter and the second shutter.

6. The machine device according to claim 5, wherein the first actuator operates on the piercing element to move the piercing element from a position of non-interference with the capsule to a position where the piercing element is in contact with and pierces the capsule.

7. The machine device according to claim 5, wherein the piercing element is hollow inside.

8. The machine according to claim 5, wherein the dispensing head includes an opening allowing insertion of the capsule into the receiving seat.

9. The machine according to claim 5, wherein the capsule comprises a powder, and the dispensing head includes a diluting device configured to deliver a diluting liquid into the capsule when the capsule is inserted in the receiving seat to obtain the additional flavor, as a combination of the powder and diluting liquid.

10. The machine according to claim 5, comprising a further container for containing a basic preparation for the basic ice cream product and a transfer duct connectable to the further container and to the processing container for transferring the basic preparation from the further container to the processing container.

11. The machine according to claim 5, wherein the supporting seat is situated and rotatable with respect to the transfer channel to separately distribute the additional flavor over different parts of a surface or body of ice cream in a final container positioned on the supporting seat.

* * * * *